March 12, 1929.	E. M. CARTER	1,705,217
WEIGHING MACHINE
Filed May 5, 1923	4 Sheets-Sheet 1
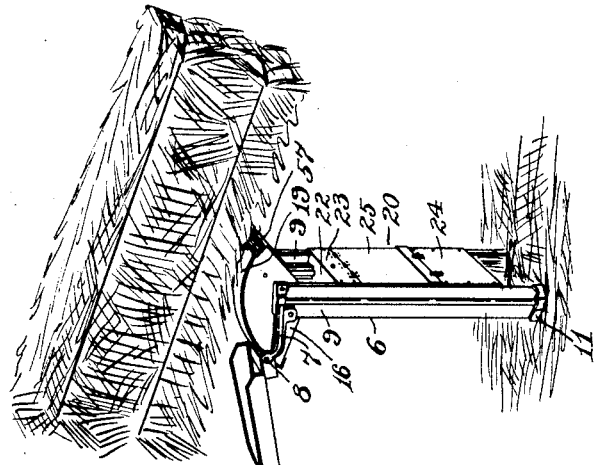
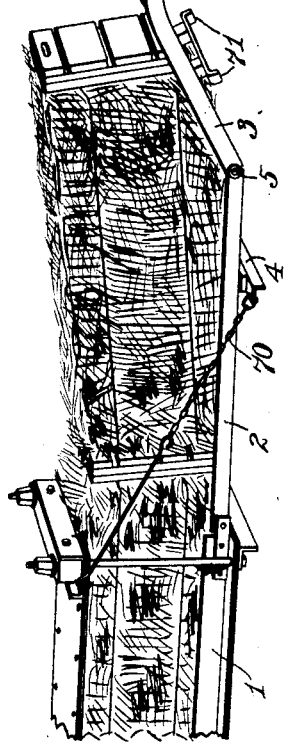
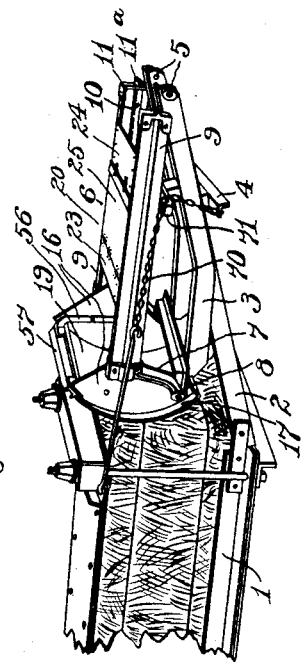
INVENTOR
Edwin M. Carter,
BY
Arthur M. Hood.
ATTORNEY

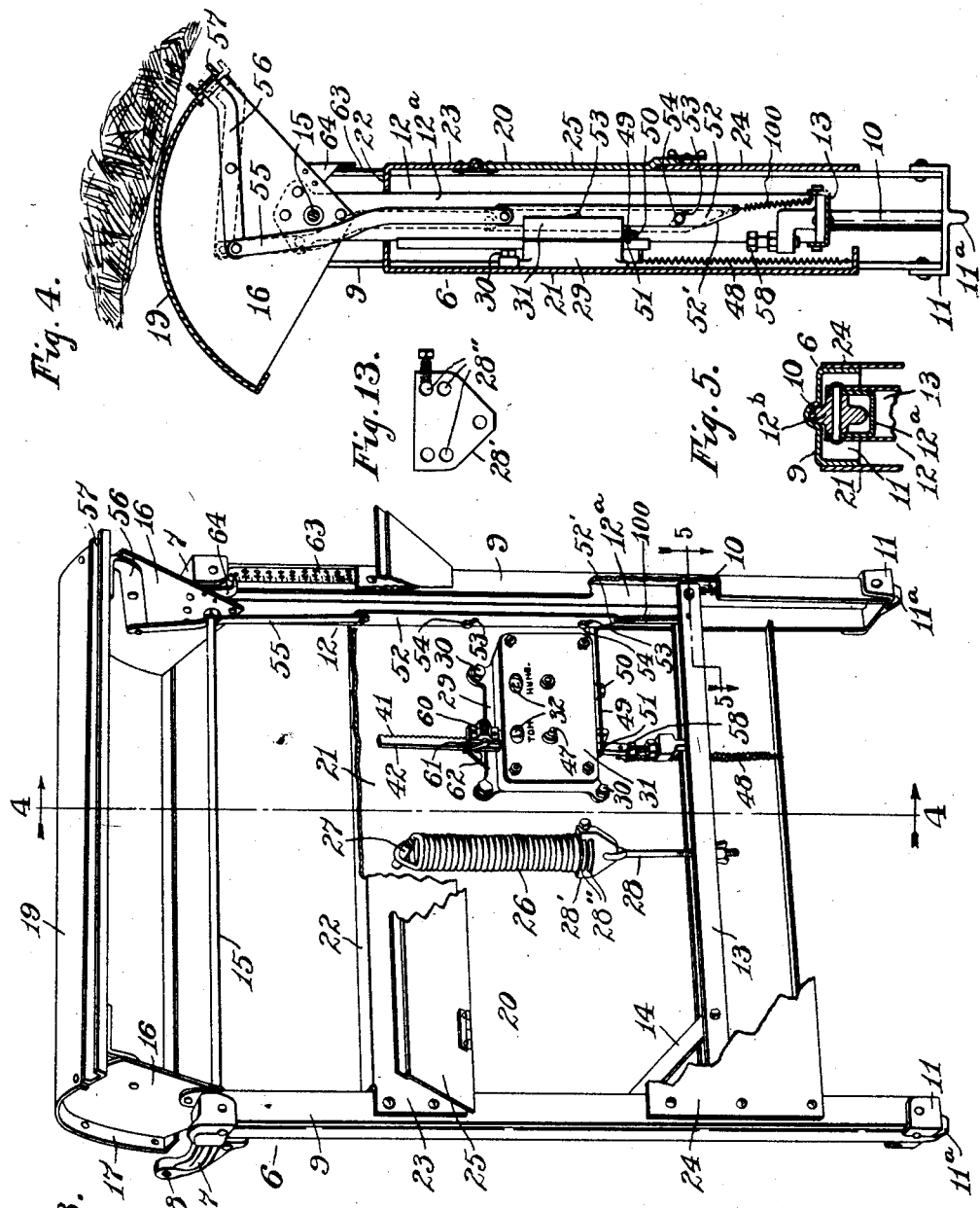

March 12, 1929.    E. M. CARTER    1,705,217
WEIGHING MACHINE
Filed May 5, 1923    4 Sheets-Sheet 3
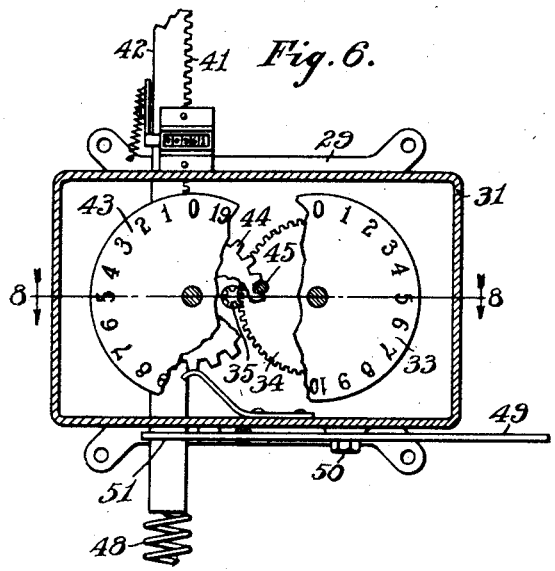
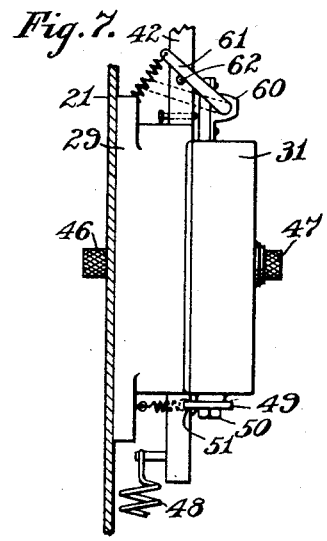
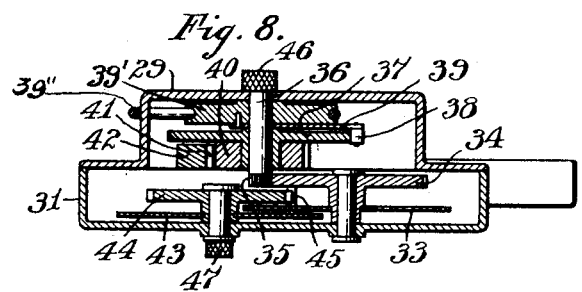
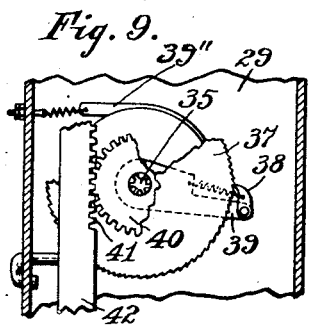
INVENTOR
Edwin M. Carter,
BY
Arthur M. Hood.
ATTORNEY March 12, 1929.  E. M. CARTER  1,705,217
WEIGHING MACHINE
Filed May 5, 1923   4 Sheets-Sheet 4

INVENTOR
Edwin M. Carter,
BY
Arthur M. Hood.
ATTORNEY

Patented Mar. 12, 1929.

1,705,217

UNITED STATES PATENT OFFICE.

EDWIN M. CARTER, OF INDIANAPOLIS, INDIANA, ASSIGNOR, BY MESNE ASSIGNMENTS, TO ARTHUR M. HOOD AND WILLIAM PERRY HAHN, TRUSTEES, BOTH OF INDIANAPOLIS, INDIANA.

WEIGHING MACHINE.

Application filed May 5, 1923. Serial No. 636,845.

My invention relates to improvements in weighing machines and has for one of its objects, to provide a registering weighing scale wherein the number of articles weighed will be registered and the total weight of a predetermined group of articles registered.

Another object of my invention is to provide a weighing scale registering the weight of the articles weighed thereon, wherein the teetering of the scale will not affect the registering mechanism and wherein the scale will settle to balance before the registering mechanism is thrown into operation.

My invention is particularly useful in connection with hay baling apparatus and it is one of the objects of my invention to provide an attachment for baling machines which will facilitate the handling of the finished bale as it is discharged from the baler and at the same time accurately weigh and count each bale and register the total number and weight of the bales coming from the baler. Further objects and advantages of my invention will appear more fully in the accompanying specification and claims.

For the purpose of disclosing my invention I have illustrated certain embodiments thereof in the accompanying drawings in which Fig. 1 is a perspective view of the delivery end of a baling machine and my improved scale attached;

Fig. 2 is a perspective view showing the weighing apparatus folded for transportation;

Fig. 3 is an enlarged perspective view of the weighing apparatus, the cover plates being broken away to show the interior construction;

Fig. 4 is a longitudinal sectional view taken on the line 4—4 of Fig. 3;

Fig. 5 is a detail section taken on the line 5—5 of Fig. 3;

Fig. 6 is a front elevation of the registering mechanism, the cover plate being removed;

Fig. 7 is a side elevation thereof;

Fig. 8 is a sectional view taken on the line 8—8 of Fig. 6;

Fig. 9 is a detail of the register driving mechanism;

Fig. 13 is a detail of the means for connecting the balance spring to the movable frame.

Figure 10:
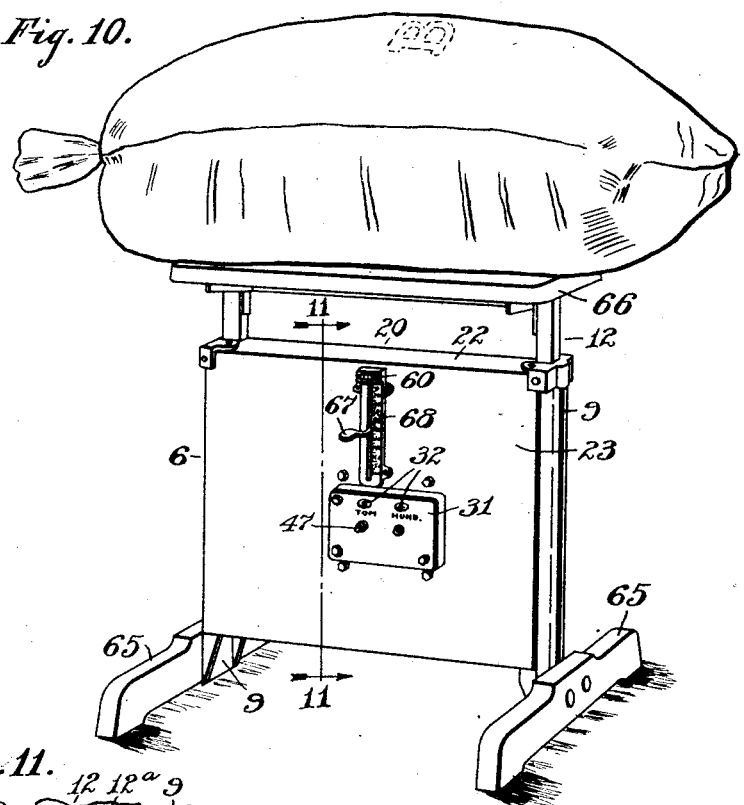
Fig. 10 is a perspective view of a modified form of my invention.

In the embodiment illustrated the delivery end 1 of a baling machine is provided with a conveyor, or chute, having a portion 2 extending substantially parallel with the delivery end of the baler and a portion 3 which inclines upwardly and forwardly. Each section of this conveyor, or chute, is preferably formed of a pair of parallel angle irons suitably held in spaced relation to one another by cross bars, such for instance as 4. The section 3 is hinged to the section 2 by a hinged joint 5 which permits this section to be folded back upon the section 2 for storage and transportation purposes. The weighing scale 6 is attached to the extremity of the section 3 of the chute, preferably being pivotally secured thereto by a pair of bracket arms 7 on opposite sides of the scale, which arms are pivoted at 8 to the forward section of the chute and project forwardly for a purpose more fully hereinafter appearing. The bracket arms 7, at their outer ends, are secured to the upper ends of a pair of vertical legs 9 which constitute the stationary supports for the weighing scale and are preferably formed from rigid channels, each having a longitudinally extending guide groove 10 formed therein. The bottoms of the legs are provided with feet 11 having spur projections 11ª adapted to sink into the ground to hold the scale rigid. A platform frame 12 is mounted for vertical movement in the channels of the legs 9 and comprises a pair of side channels 12ª having secured therein at their tops and bottoms, rollers 12ᵇ which operate in the grooves 10. Cross bars 13 connect the two side channels 12ª of the frame together and at suitable points the corners of the frame are braced by diagonal braces 14. A connecting rod 15 extends between the upper ends of the side channels 12ª of the frame to suitably space these members at their upper end. Mounted upon and extending beyond the upper ends of the frame and the upper ends of the legs, is a pair of V-shaped side members 16 which are suitably riveted at their apices to the upper ends of the side members and having arcuate bases 17. A balancing, bale-receiving platform 19, preferably in the form of a single sheet of material is secured to the arcuate bases of the pieces 16 and is so related with the chute as to receive the bale as it is being delivered from the baler and weigh the same.

Due to the upward inclination of the chute section 3, as the forward end of the bale moves up this chute it tends to break loose the rear end of the bale from the end board and as the bale passes onto the arcuate balancing and weighing platform and passes over the crown or highest part thereof, the rear end tilts upwardly, thereby breaking loose the upper portion of the rear end of the bale from the end board so that the bale, when resting on the arcuate platform, is free.

The scale spring and registering parts of the scale are preferably enclosed within an enclosing casing and to this end I provide a casing 20 which is preferably formed from a single piece of sheet metal. The side member 21 which is provided with end flanges adapted to be riveted or otherwise secured to the sides of the legs 9, is bent at right angles to form the top 22 of the casing and then at its upper and lower ends again bent at right angles to form the upper and lower side sections 23 and 24 which, as shown, are riveted or otherwise secured to the opposite sides of the legs 9. The upper and lower sections 23 and 24 being spaced apart, provide an opening through which access may be had to the interior of the casing, which opening is normally closed however, by a door 25 hinged to the upper section 23. This casing not only provides a closure member for the counting and spring balance mechanism of the frame, but also provides a brace and connecting means for the legs 9.

The vertically movable frame 12 is supported by a balance spring 26, one end of which is stationarily supported from a post 27 mounted in the side 21 of the casing. The opposite end of the spring is secured by a suitable shackle 28 to the lower cross bars 13 of the movable frame so that the frame is resiliently supported by the spring from the stationary legs 9. The shackle 28 is provided with a head 28' having openings 28'' into which the convolutions of the spring are threaded to permit the changing of the effective length of the spring.

The counting and registering mechanism is preferably enclosed within an enclosing casing comprising a base 29 secured within the enclosing casing 20 and on the side member 21 thereof by bolts 30 passing through lugs on said base, and a cover 31. The counting mechanism is all mounted within this cover, the numeral dials being visible through suitable openings 32 in the cover. This counting mechanism is of the usual construction and is provided with ton and hundredweight dials. The hundredweight dial 33 is mounted upon the hub of a gear wheel 34 meshing with a pinion 35 mounted on a shaft 36 having a ratchet wheel 37 loosely mounted thereon and which in turn operates a pawl 38 mounted on an oscillating arm 39. This arm is mounted on a drum 39' secured on the shaft 36 and having a friction band 39''. The ratchet wheel 37 has fixedly secured on its hub a gear wheel 40 meshing with a rack 41 on a reciprocating arm 42 which serves as an actuator for the registering mechanism. The tons dial 43 is mounted on the hub of a gear wheel 44 operated by a pin 45 on the gear wheel 34. The shaft 36 is provided with a knurled extension 46 by which the hundredweight dial may be set back to zero and the shaft of the ton gear wheel 44 is likewise provided with a knurled portion 47 by which it may be set back to zero. The pawl 38 and ratchet 37 are so arranged that movement will be imparted to the pawl and arm by the ratchet wheel only on the upward stroke of the arm 42, the downward stroke of the arm being merely a positioning stroke. The friction band 39'' serves to prevent lash on the part of the drum 39' and arm 39 and also to prevent the arm 39 from over-running under the momentum of its drive by the ratchet wheel 37. The arm 42 is urged downwardly under the influence of a spring 48, one end of which is connected to the arm and the other end to the bottom of the casing. This arm is held normally in its upper position against the urge of the spring 48 by a latch arm 49 pivoted at 50 to the under side of the casing 31 and having its other end arranged to engage in a notch 51 in the arm. The outer end of this arm is manipulated, to disengage the arm from the notch 51, by a cam plate 52. This plate is provided with a pair of cam notches 53 through which pass bolts 54 by which the plate is secured to one of the side members 12ª of the vertically movable frame and the plate, at its upper end, is connected by a link 55 with the inner end of a lever arm 56 pivoted to one of the side plates 16 and secured to a cross bar 57, the opposite end of which is rockably supported from the opposite plate 16. The lower end of the plate 52 is inclined away from the lever 49 at 52' so that the depression of the scale frame downwardly a slight distance will not release the trigger mechanism. This permits of the passage over the scale of articles weighing less than a predetermined value without causing the scale to register. The distance downwardly that the frame may move before the plate 52 will operate the lever 49 when elevated by the operation of the bar 57 may be determined by the extent of inclination of the portion 52'. This arrangement permits of the passage of end boards or header blocks or incomplete sections of the bale over the scale without causing the scale to register.

The arm 42 is limited in its downward movement, when released by the trigger 49, by a stop 58 supported on the cross bars 13 so that when the trigger 49 is released the arm will project downwardly a distance equal to the distance the weighing platform 19 has been moved downwardly under the influence of the weight of the bale and this will position the pawl 38 relatively on the ratchet wheel 37 so that as the arm 42 is moved upwardly to its normal position the ratchet wheel will be rotated an equal distance, thereby moving the dials of the recording instrument to record the weight of the bale.

In operation, as the bale moves along the conveyor, or chute, its forward end, on riding up the inclined section 3, tilts the rear end away from the division board, thereby breaking such particles of the baled material which would tend to adhere to the next succeeding bale, away. The continued forward movement of the bale causes it to ride up on the arcurate weighing platform 19 where the tendency of the bale will be for its forward end to tilt slightly downwardly, thus breaking the bale clear from the next succeeding bale so that the bale will rest free on the weighing platform. The weight of the bale of course will move the platform downwardly against the tension of the spring 26 a distance equal to the weight of the bale, but due to the fact that the trigger 49 is in engagement with the bar 42, the bar 42 of the counting and recording mechanism remains stationary until the teetering of the platform has stopped. Due to the fact that the platform 19 is arcurate with its center in alignment with the center of the side members of the frame 12, there is a point during the tilting of the bale on the platform 19 when the center of gravity of the bale is exactly perpendicular to the line of movement of the frame and there will be no tendency to tilt the frame in one direction or the other, the frame practically floating on the balancing spring. The continued tilting movement of the bale as it tilts off the weighing platform, causes its under side to engage the cross bar 57 which moves the front end of the lever 56 downwardly and the rear end of the lever upwardly, thereby moving the cam plate 52 upwardly and due to the cam slots 53, this plate will be moved transversely thereby rocking the lever 49 and moving its end out of the slot 51, permitting the reciprocating bar 42 to move downwardly until it is stopped by the stop member 58. This positions the counter mechanism and as soon as the weight of the bale is removed from the platform 19, the spring 26 will raise the balanced frame upwardly again and with it the reciprocating arm 42, which is thus moved back to normal position and during its movement back to normal position, operates the register. As soon, also, as the weight is removed from the bar 57 the cam plate 52 will be urged downwardly and away from the trigger lever 49 under the influence of the spring 100 so that the trigger lever 49 will again engage in the slot 51 to hold the reciprocating bar 42 in its raised position. It is thus seen that the mechanism is a single-action mechanism, it acting once only to operate the registering mechanism instead of operating a number of times as the balancer teeters.

The bale, when projected onto the arcuate platform, is projected slightly beyond the center of gravity so that it immediately commences to tilt downwardly, due to its position and shape of the platform. However, the weight of the bale will have depressed the weighing frame before the bale can completely tilt off the arcuate platform so that the movement of the bale will not effect the weighing and registering operation. The continued downward and forward movement or tilting of the bale eventually moves it sufficiently near the perpendicular to permit the platform to slide up the bale to normal position before, however, any portion of the bale touches the ground. As a result, the bale acts as a brake for the return movement of the movable frame and prevents the platform from being projected upwardly too rapidly. At the same time the upward movement of the frame gives the rear end of the bale a flip which will cause the bale to turn over when it strikes the ground and thus roll clear of the scale.

Mounted upon the cover 31 is an odometer 60, the operating lever 61 of which is arranged in the path of a pin 62 on the reciprocating arm 42 so that as the arm moves upwardly the odometer will be moved one step to record the number of bales weighed.

In order that the weight of each bale may be observed by the operator at the time it is weighed, a scale 63 is provided on one of the legs 9 and a pointer 64 on the movable frame so that as the weight of the bale depresses the frame the weight of the bale may be observed.

Figure 11:
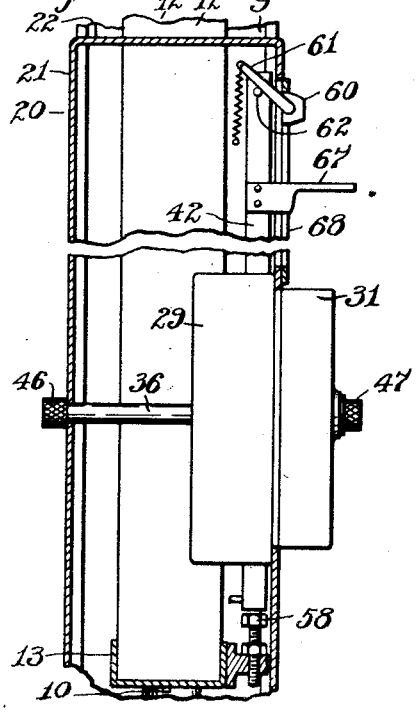
Fig. 11 is a sectional view taken on the line 11—11 of Fig. 10.
Figure 12:
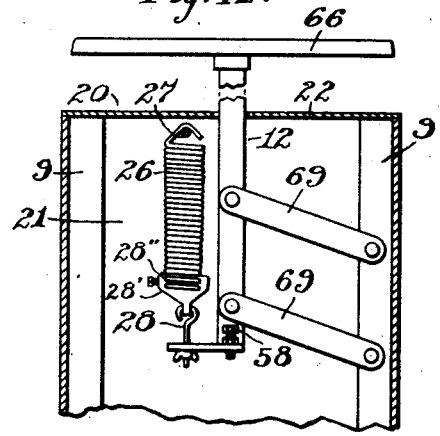
Fig. 12 is a detail section showing the means for maintaining the weighing platform against tilting.

In the structure illustrated in Figs. 10, 11 and 12, I have shown a modification of my device, wherein a scale is provided for weighing articles of various character. In this structure the two legs 9 have cross feet 65 which maintain the same in a vertical position and the vertically movable frame is provided with a flat platform 66 for receiving the articles. The weight-registering mechanism is mounted on the exterior of the casing, although the reciprocating bar 42 is arranged interiorly of the casing. This bar in the structure illustrated is manually manipulated instead of automatically manipulated, as illustrated in Figs. 1 to 9. To this end the bar is provided with a finger member 67 which projects through a slot in the casing and not only operates as a means for manually manipulating the bar 42, but also co-operates with the scale 68 to indicate the weight of the particular article being weighed. When the article is placed on the platform 66, the frame is depressed and the stop member 58 moved downwardly therewith, the operator then, by manipulating the finger piece 67, after the scale has stopped teetering, moves the bar 42 downwardly until the end of the bar 42 comes in engagement with the stop 58. When the weight is removed from the platform the upward movement of the stop 58 raises the arm 42 as heretofore described with respect to the structure shown in Figs. 1 to 9 to operate the registering mechanism. At the same time, the pin 62 on the bar will move the odometer arm 61 to operate the odometer to count the article. The operator may then remove the article and the scale is in readiness for the next article.

In order to maintain the platform and frame against tilting, the side members of the frame are connected by a pair of links 69 to one of the legs 9, the links being pivotally connected both to the legs and to the side members of the frame as illustrated in Fig. 12.

When the structure illustrated in Figs. 1 to 9 is out of use, it may be readily folded back out of the way. The pivot points 5 and 8 permit the section 3 to fold back upon the section 2 of the chute and the scale to be folded substantially parallel with the section 3, with its top in a position immediately in front of the bale delivery end of the baler. The chain 70 which is connected to the delivery end of the baler may be passed over the laterally extending hook 71 on the chute section 3 and connected to the cross arm 4. This holds the parts from rattling and by forcing the bale remaining in the baler against the platform 19, the whole structure will be rigidly held in a storage position.

I claim as my invention:

1. In a weighing scale the combination with a depressible platform, of a registering mechanism, operating means for said mechanism normally disconnected from said platform to permit said platform to move in either direction without operating said mechanism, means actuated by movement of the weight from the platform for connecting said operative means to the platform after the platform has come to rest under the weight thereon, said platform when moving back to initial position moving said registering mechanism proportionately to the distance the platform has been depressed by the weight.

2. In a weighing scale, the combination with a depressible platform, of a registering mechanism, operating means for said registering mechanism normally so related with said platform as to permit said platform to move independently of said operative means in either direction when receiving the weight, and means actuated by movement of the weight from the platform upwardly connecting said operating means and platform subsequent to rest of the platform under the weight, whereby the register will be advanced proportionately to the distance the platform has been depressed by the weight.

3. In a weighing scale, the combination with a depressible platform, of a registering mechanism, means for operating said mechanism and operatively connected therewith to drive the mechanism in one direction only, said operating means being normally inoperative relative to the platform, and means controlled by movement of an applied weight from the platform for rendering said operating means active so as to be operated by the platform when it returns to initial position to move said registering means proportionately to the distance the platform has been depressed by the weight.

4. A bale scale arranged to be associated with a discharge end of a baler to receive the bales as they are discharged from said baler, including a registering mechanism for registering the weight of the bale and a depressible platform, said registering mechanism being normally disconnected from the platform to permit the platform to move in either direction independently of the registering mechanism when receiving the bale, and means comprising an element actuated by movement of the bale as it is moved across the platform in a discharging direction for connecting the platform with the registering mechanism whereby said platform will move said registering mechanism when it returns to normal position as the bale has moved thereoff proportionately to the distance the platform has been depressed by the weight of the bale.

5. A baler and a bale weighing scale arranged to receive the bale as it is delivered from the baler, said weighing scale including a movable platform, a registering mechanism, means for operating said registering mechanism normally disconnected from said platform to permit the platform to move independently of the registering mechanism in either direction when receiving the bale, a trip mechanism for connecting said operating mechanism with the platform after the platform has been depressed by the weight of the bale, said trip mechanism adapted to be operated by the movement of the bale in a delivery direction to connect said operating mechanism so as to be moved by the platform as it returns to normal position when relieved of the weight of the bale, to move said registering mechanism proportionately to the distance the platform has been depressed by the weight of the bale.

6. A bale weighing machine arranged to be associated with the delivery end of a baler and including a depressible platform for receiving the bale as it is delivered from the baler, a registering mechanism, means for operating said registering mechanism, means having a constant tendency to move said operating means to projected position, means for holding the operating means against said tendency and for holding it normally disconnected from the platform to permit the platform to be moved in either direction independently of the operating means when receiving a bale, and a trip mechanism operated by the movement of the bale in a delivery direction for releasing said holding means to permit said operating means to be moved into projected position and in connection with the depressible platform so as to cause said operating mechanism to move the registering mechanism proportionately to the distance the platform has been depressed upon the return movement of the platform to normal position after the weight of the bale has been removed therefrom.

7. The combination with a baler, of a weighing machine for weighing the bales formed by said baler and having a vertically reciprocable bale receiver and a delivery chute arranged at the discharge end of said baler and delivering to said bale receiver, said chute comprising an upwardly inclined portion arranged to tilt the forward end of each bale substantially upwardly, the bale receiver comprising a fulcrum upon which each bale tilts to swing the rear end of each bale upwardly from the succeeding bale.

8. The combination with a baler, of a weighing machine for weighing the bales as they are delivered from said baler and having a vertical reciprocable bale receiver and a delivery chute for receiving the bale from the baling machine and delivering the same to said bale receiver, said chute having its delivery end inclined upwardly to tilt the forward end of the bale upwardly and permit the weight of the bale as the bale is delivered to said bale receiver to swing the rear end of the bale upwardly to break the material of the bale free from the next succeeding bale before the weighing operation is completed.

9. In a weigher for balers, a frame, a bale support mounted in said frame and depressible under the weight of an applied bale, said support being formed to permit the bale to tilt as said bale traverses the support, registering means operated by a movement of said support, and a controller for said registering means, said controller being engaged and actuated by a tilted bale.

10. The combination of a baler, a weigher, a chute adapted to be folded in relation to said baler, and weighing mechanism associated with said chute and adapted to be folded thereon.

11. The combination in a weigher for balers, of a chute adapted to be positioned at the rear end of said baler, a supplemental chute hingedly secured to said chute, a weighing mechanism comprising a frame hingedly connected to said supplemental chute whereby said supplemental chute, frame and weighing mechanism may be compactly folded upon said chute.

12. The combination with a baler, of a chute positioned at the rear end thereof and having one end pivotally connected to and supported by the baler and a weighing mechanism associated with said chute and pivotally connected to and supporting the opposite end of said chute to permit a vertical vibration of the baler without affecting the weighing mechanism.

13. A bale scale arranged to be associated with the discharge end of a baler to receive the bales as they are discharged from a baler, said scale including a registering mechanism for registering the weight of the bale and a depressible platform, said registering mechanism being normally disconnected from the platform to permit the platform to move independently of the mechanism when receiving the bale, means for automatically connecting the platform to the registering mechanism, said means being in the path of movement of, and actuated by, the bale as it is moved across the platform in discharging direction, said platform, when it returns to normal position after the bale has moved thereoff, moving the registering device proportionately to the distance the platform has been depressed by the weight of the bale.

14. In a weigher for balers, a frame, a bale support and balancer movably mounted in said frame and having a bale supporting portion affording a small-area support for the bale intermediate the bale ends whereby said bale may tilt on the balancer before being delivered therefrom.

15. In a weigher for balers, a frame, a bale support and balancer movably mounted in said frame, registering mechanism connected with said frame and communicating with said support for weighing the bale and means for delivering the bale onto the balancer, as it is moved forward by the next succeeding bale, in such a position as to cause the bale to tilt on the balancer away from the next succeeding bale.

16. A delivery chute for a baler and a weigher for balers comprising a frame, a bale support and balancer movably mounted in said frame, the bale receiving surface of said balancer being formed with a register transversely of the line of expected movement of a bale thereacross whereby the said support may be associated with a delivery chute with its peak at a point higher than the bottom of the delivery chute so that the bale, as it is forced out of the baler, will be inclined upwardly onto the balancer and thereafter tilted in the opposite direction as it is forced over the balancer.

17. In a weighing scale for balers, a main frame, a bale-receiver vertically movable in said main frame and provided with a bale-receiving surface over which the bale may be readily projected and upon which the bale may tilt and means associated with said surface for relatively retarding sliding movement between the bale and receiver during the final discharge movement of the bale from the receiver.

18. In a weighing scale for balers, a main frame, a bale-receiver vertically movable in said main frame and provided with a bale-receiving surface over which the bale may be readily projected and upon which the bale may tilt, means associated with said surface for relatively retarding sliding movement between the bale and receiver during the final discharge movement of the bale from the receiver, registering mechanism associated with said bale-receiver and a single-action means to affect said register only once for each applied weight.

19. In a weighing scale for balers, a main frame, a bale-receiver vertically movable in said main frame and provided with a bale-receiving surface over which the bale may be readily projected and upon which the bale may tilt, means associated with said surface for relatively retarding sliding movement between the bale and receiver during the final discharge movement of the bale from the receiver, registering mechanism, an actuator for said registering mechanism normally disconnected therefrom, and means, operable by the bale during its discharging tilting movement, for operatively associating the actuator with the receiver so as to be impelled by the latter only upon the final upward movement thereof.

20. A weighing mechanism for balers comprising a main frame, a bale receiver vertically reciprocable in said main frame and provided with a rounded bale receiving surface over which the bale may be projected and upon which the bale may tilt, means for normally yieldingly holding said receiver in its upper position, a register, an actuator for said register movable with said frame in one direction, means for normally biasing said actuator in the opposite direction, a latch normally restraining said actuator against its biasing and means for retracting said latch, including an element arranged in position to be actuated by the discharging movement of the bale from the receiver.

21. A weighing mechanism for balers comprising a main frame, a bale receiver vertically reciprocable in said main frame and provided with a rounded bale receiving surface over which the bale may be projected and upon which the bale may tilt, means for normally yieldingly holding said receiver in its upper position, a register, an actuator for said register movable with said frame in one direction, means for normally biasing said actuator in its opposite direction, a latch normally restraining said actuator against its bias, means for retracting said latch, including an element arranged in position to be actuated by the discharging movement of the bale from the receiver, and retardingly engaging the bale in its discharging movement to retard the sliding movement of the bale as the bale is falling from the receiver.

In witness whereof, I, EDWIN M. CARTER have hereunto set my hand at Indianapolis, Indiana, May, A. D. one thousand nine hundred and twenty three.

EDWIN M. CARTER.